(12) United States Patent
Minamisawa

(10) Patent No.: US 11,409,125 B2
(45) Date of Patent: Aug. 9, 2022

(54) OPTICAL UNIT WITH SHAKE CORRECTION FUNCTION

(71) Applicant: NIDEC SANKYO CORPORATION, Nagano (JP)

(72) Inventor: Shinji Minamisawa, Nagano (JP)

(73) Assignee: NIDEC SANKYO CORPORATION, Nagano (JP)

( * ) Notice: Subject to any disclaimer, the term of this patent is extended or adjusted under 35 U.S.C. 154(b) by 174 days.

(21) Appl. No.: 16/858,050

(22) Filed: Apr. 24, 2020

(65) Prior Publication Data

US 2020/0341289 A1     Oct. 29, 2020

(30) Foreign Application Priority Data

Apr. 24, 2019 (JP) .............................. JP2019-082554

(51) Int. Cl.
*G02B 27/64* (2006.01)
*G03B 5/00* (2021.01)

(52) U.S. Cl.
CPC ............ *G02B 27/646* (2013.01); *G03B 5/00* (2013.01); *G03B 2205/0007* (2013.01); *G03B 2205/0069* (2013.01)

(58) Field of Classification Search
None
See application file for complete search history.

(56) References Cited

U.S. PATENT DOCUMENTS

| 2016/0170227 A1* | 6/2016 | Minamisawa | G02B 27/646 |
| | | | 359/557 |
| 2018/0321505 A1* | 11/2018 | Minamisawa | G02B 27/646 |
| 2020/0310228 A1* | 10/2020 | Sue | H04N 5/2257 |

FOREIGN PATENT DOCUMENTS

JP          2019015847 A     1/2019

* cited by examiner

*Primary Examiner* — Derek S. Chapel
(74) *Attorney, Agent, or Firm* — Cantor Colburn LLP

(57) ABSTRACT

An optical unit with a shake correction function may include a movable body, a gimbal mechanism swingably supporting the movable body around a first axis and a second axis, a fixed body supporting the movable body. The gimbal mechanism may include a gimbal frame, a first connection mechanism turnably connecting the movable body with the gimbal frame around the first axis, and a second connection mechanism turnably connecting the fixed body with the gimbal frame around the second axis. The first connection mechanism may include a first spherical body and a first concave curved face point-contacted with the first spherical body. The movable body may include an outer case and a protruded part protruded from the outer case at a diagonal position of the outer case in the first axis direction, and one of the first spherical body and the first concave curved face may be disposed in the protruded part.

16 Claims, 9 Drawing Sheets

OPTICAL UNIT WITH SHAKE CORRECTION FUNCTION

CROSS REFERENCE TO RELATED APPLICATION

The present invention claims priority under 35 U.S.C. § 119 to Japanese Application No. 2019-082554 filed on Apr. 24, 2019, and the entire content of which is incorporated herein by reference.

TECHNICAL FIELD

The present invention relates to an optical unit with a shake correction function structured to perform a shake correction of an optical module such as a camera module.

BACKGROUND

An optical unit which is mounted on a portable terminal or a movement body may include a mechanism structured to swing or turn a movable body on which an optical module is mounted to correct a shake in order to restrain disturbance of a photographed image of the portable terminal or when the movement body is moved. Such an optical unit with a shake correction function is disclosed in Japanese Patent Laid-Open No. 2019-015847 (Patent Literature 1).

The optical unit with a shake correction function described in Patent Literature 1 includes a gimbal mechanism structured to swingably support a movable body with respect to a fixed body around a predetermined axis. The gimbal mechanism includes a gimbal frame (movable frame) in a rectangular frame shape and a connection mechanism which connects the gimbal frame with the movable body and the fixed body. The connection mechanism includes a spherical body and a spherical body support part provided with a hemispherical shaped recessed part with which the spherical body is contacted.

When axial directions which are perpendicular to an optical axis and perpendicular to each other are defined as a first axis and a second axis, the connection mechanism includes the spherical bodies provided in one of the movable body and the gimbal frame and the spherical body support parts provided in the other of the movable body and the gimbal frame at diagonal positions in the first axis direction of the gimbal frame, and the spherical bodies provided in one of the fixed body and the gimbal frame and the spherical body support parts provided in the other of the fixed body and the gimbal frame at diagonal positions in the second axis direction of the gimbal frame. As a result, the movable body is swingably supported around the first axis with respect to the gimbal frame, and the movable body and the gimbal frame are swingably supported around the second axis with respect to the fixed body.

In Patent Literature 1, the movable body includes a camera module and a holder (camera module holder) which holds the camera module from an outer peripheral side. A first connection mechanism which connects the movable body with the gimbal frame (movable frame) is structured at diagonal positions in the first axis (first axial line) direction of the camera module holder. The first connection mechanism includes a first contact spring holding part provided at a diagonal position in the first axis (first axial line) direction of the camera module holder, a contact spring fixed to the first contact spring holding part, and a spherical body which is welded on the gimbal frame (movable frame) at a diagonal position in the first axis direction. The first connection mechanism is structured by point-contacting a hemispherical shaped recessed part (point contact part) of the contact spring with the spherical body.

In order to reduce a size of an optical unit with a shake correction function, a movable body and a gimbal mechanism are required to make a simple and space-saving structure. In Patent Literature 1, a movable body includes a holder (camera module holder) which is another member surrounding an outer peripheral side of a camera module, and a contact spring structuring a first connection mechanism of a gimbal mechanism is disposed in the holder. Therefore, a structure of the movable body becomes complicated and a size of the movable body is increased. Therefore, it is difficult to reduce a size of an optical unit with a shake correction function.

SUMMARY

In view of the problem described above, at least an embodiment of the present invention may provide an optical unit with a shake correction function whose size is reduced by reducing a size of a movable body which is supported by a gimbal mechanism.

To solve the above-mentioned problem, at least an embodiment of the present invention may provide an optical unit with a shake correction function including a movable body having an optical element, a gimbal mechanism which swingably supports the movable body around a first axis intersecting an optical axis and swingably supports the movable body around a second axis intersecting the optical axis and the first axis, a fixed body which supports the movable body through the gimbal mechanism, and a shake correction drive mechanism structured to swing the movable body around the first axis and the second axis. The gimbal mechanism may include a gimbal frame, a first connection mechanism which turnably connects the movable body with the gimbal frame around the first axis, and a second connection mechanism which turnably connects the fixed body with the gimbal frame around the second axis. The first connection mechanism may include a first spherical body provided in one of the movable body and the gimbal frame, and a first concave curved face which is provided in the other of the movable body and the gimbal frame and is point-contacted with the first spherical body. The second connection mechanism may include a second spherical body provided in one of the fixed body and the gimbal frame, and a second concave curved face which is provided in the other of the fixed body and the gimbal frame and is point-contacted with the second spherical body. The movable body may include an outer case and a protruded part which is protruded from the outer case to an outer peripheral side at a diagonal position of the outer case in a direction of the first axis, and one of the first spherical body and the first concave curved face may be disposed in the protruded part.

According to at least an embodiment of the present invention, the first connection mechanism of the gimbal mechanism may be disposed in the protruded part which is protruded from the outer case of the movable body. Therefore, a new structure is not required to provide on an outer peripheral side of the outer case except the protruded part disposed at a diagonal position and thus, an outer shape of the movable body can be made small. Accordingly, a size of the movable body can be reduced and thus, the optical unit with a shake correction function can be made small.

In at least an embodiment of the present invention, it is preferable that the optical element is a lens, the movable body is a camera module including the lens, an imaging element which is disposed on the optical axis of the lens and the outer case, and the protruded part is provided in the camera module. As described above, in a case that the movable body is a camera module, when a protruded part is provided at a diagonal position in the first axis direction of the camera module to dispose the first connection mechanism, a new structure is not required to provide on an outer peripheral side of the camera module. Therefore, a size of the movable body can be reduced in a direction perpendicular to the optical axis.

In at least an embodiment of the present invention, it is preferable that the protruded part is integrally formed with the outer case. According to this structure, in comparison with a case that the protruded part is separately provided from the outer case, the number of components can be reduced. Further, fixing work of the protruded part is not required and thus, assembling work can be simplified. Further, the protruded part is not dropped.

In at least an embodiment of the present invention, it is preferable that the outer case is provided with a chamfer part which is formed by chamfering a corner part in the direction of the first axis when viewed in a direction of the optical axis, and the protruded part is protruded from the chamfer part. For example, it is preferable that the outer case is formed in an octagonal planar shape which is formed by chamfering corner parts of a rectangular shape whose diagonal directions are the first axis and the second axis when viewed in the direction of the optical axis. According to this structure, a space for disposing the protruded part can be secured at a diagonal position in the first axis direction. Therefore, an outer shape of the movable body can be made small in a direction perpendicular to the optical axis.

In at least an embodiment of the present invention, it is preferable that the shake correction drive mechanism includes a magnet provided in the movable body and a coil provided in the fixed body, and the magnet is fixed to the outer case. According to this structure, a new structure is not required to provide on an outer peripheral side of the camera module for fixing the magnet. Therefore, the movable body can be made small in a direction perpendicular to the optical axis.

In this case, it is preferable that the camera module includes a magnetic drive mechanism structured to drive the lens, and the outer case is made of a magnetic member. According to this structure, a magnetic field generated from a magnet structuring the shake correction drive mechanism can be shielded by the outer case. Therefore, the magnet of the shake correction drive mechanism which is fixed to the outer case can be prevented from magnetically affecting the magnetic drive mechanism for driving the lens which is mounted on the camera module.

Alternatively, it is preferable that the camera module includes a magnetic drive mechanism structured to drive the lens, the outer case is made of a nonmagnetic member, and the magnet is fixed to the outer case through a magnetic plate. According to this structure, a magnetic field generated from the magnet structuring the shake correction drive mechanism can be shielded by the magnetic plate. Therefore, the magnet of the shake correction drive mechanism which is fixed to the outer case can be prevented from magnetically affecting the magnetic drive mechanism for driving the lens which is mounted on the camera module.

In at least an embodiment of the present invention, it is preferable that the first connection mechanism includes a gimbal frame receiving member having one of the first spherical body and the first concave curved face, and the protruded part is provided with an accommodation part in which the gimbal frame receiving member is disposed. According to this structure, the first connection mechanism is disposed at a position where the first connection mechanism is hard to be affected from the outside In at least an embodiment of the present invention, it is preferable that the gimbal frame is provided with a first frame portion which is overlapped with the outer case when viewed in the direction of the optical axis, a first support part extended part which is extended to the direction of the optical axis from a diagonal position in the direction of the first axis of the first frame portion, and a second support part extended part which is extended to the direction of the optical axis from a diagonal position in the direction of the second axis of the first frame portion. The first support part extended part is elastically deformable in the direction of the first axis, and one of the first spherical body and the first concave curved face is provided in the first support part extended part and is elastically contacted in the direction of the first axis with the other of the first spherical body and the first concave curved face which is disposed in the protruded part. The second support part extended part is elastically deformable in the direction of the second axis, and one of the second spherical body and the second concave curved face is provided in the second support part extended part and is elastically contacted in the direction of the second axis with the other of the second spherical body and the second concave curved face which is disposed in the fixed body. According to this structure, the first spherical body and the first concave curved face can be elastically contacted with each other by an elastic force of the first support part extended part, and the second spherical body and the second concave curved face can be elastically contacted with each other by an elastic force of the second support part extended part. Therefore, the first spherical body and the first concave curved face are surely abutted with each other, and the second spherical body and the second concave curved face are surely abutted with each other and thus, deviation of the support position in the gimbal mechanism is suppressed.

In at least an embodiment of the present invention, it is preferable that the first support part extended part generates an elastic force toward an outer peripheral side, and one of the first spherical body and the first concave curved face is provided in the first support part extended part and is elastically contacted from an inner peripheral side with the other of the first spherical body and the first concave curved face which is disposed in the protruded part. According to this structure, a member which receives an elastic force of the first support part extended part of the gimbal frame is disposed on an outer peripheral side with respect to the first support part extended part. Therefore, the gimbal mechanism can be assembled while visually recognizing a position of a member which receives an elastic force of the first support part extended part. Accordingly, the gimbal mechanism is easily assembled.

In this case, it is preferable that the protruded part is provided with a wall part which is disposed on an outer peripheral side with respect to the first support part extended part, and a connection part which connects an end part in the direction of the optical axis of the wall part with an outer peripheral face of the outer case. According to this structure, an elastic force of the first support part extended part is received by the wall part and thus, deviation of the support position is reduced. Further, the connection part is connected with an end part in the optical axis direction of the wall part and thus, a structure of the protruded part can be simplified and a width in a circumferential direction of the protruded part can be reduced.

Alternatively, in at least an embodiment of the present invention, it is preferable that the first support part extended part generates an elastic force toward an inner peripheral side, one of the first spherical body and the first concave curved face is provided in the first support part extended part and is elastically contacted from an outer peripheral side with the other of the first spherical body and the first concave curved face which is disposed in the protruded part. According to this structure, a member which receives an elastic force of the first support part extended part is disposed on an inner peripheral side with respect to the first support part extended part. Therefore, a member which receives an elastic force is not required to dispose on an outer peripheral side of the first support part extended part and thus, a size of the protruded part can be reduced.

Effects of the Invention

According to the present invention, the first connection mechanism of the gimbal mechanism is disposed in the protruded part which is protruded from the outer case of the movable body. Therefore, a new structure is not required to provide on an outer peripheral side of the outer case except the protruded part disposed at a diagonal position and thus, an outer shape of the movable body can be made small. Accordingly, a size of the movable body can be reduced and thus, the optical unit with a shake correction function can be made small.

Other features and advantages of the invention will be apparent from the following detailed description, taken in conjunction with the accompanying drawings that illustrate, by way of example, various features of embodiments of the invention.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION

Embodiments of an optical unit 1 with a shake correction function to which the present invention is applied will be described below with reference to the accompanying drawings. In the present specification, three axes of "X", "Y" and "Z" are axial line directions perpendicular to each other, and one side in the "X"-axis direction is indicated with "+X" and the other side is indicated with "−X", one side in the "Y"-axis direction is indicated with "+Y", the other side is indicated with "−Y", and one side in the "Z"-axis direction is indicated with "+Z" and the other side is indicated with "−Z". The "Z"-axis direction is coincided with an optical axis "L" direction of a camera module 2. Further, the "+Z" direction is one side (object side) in the optical axis "L" direction and the "−Z" direction is the other side (image side) in the optical axis "L" direction.

(Entire Structure)

Figure 1:
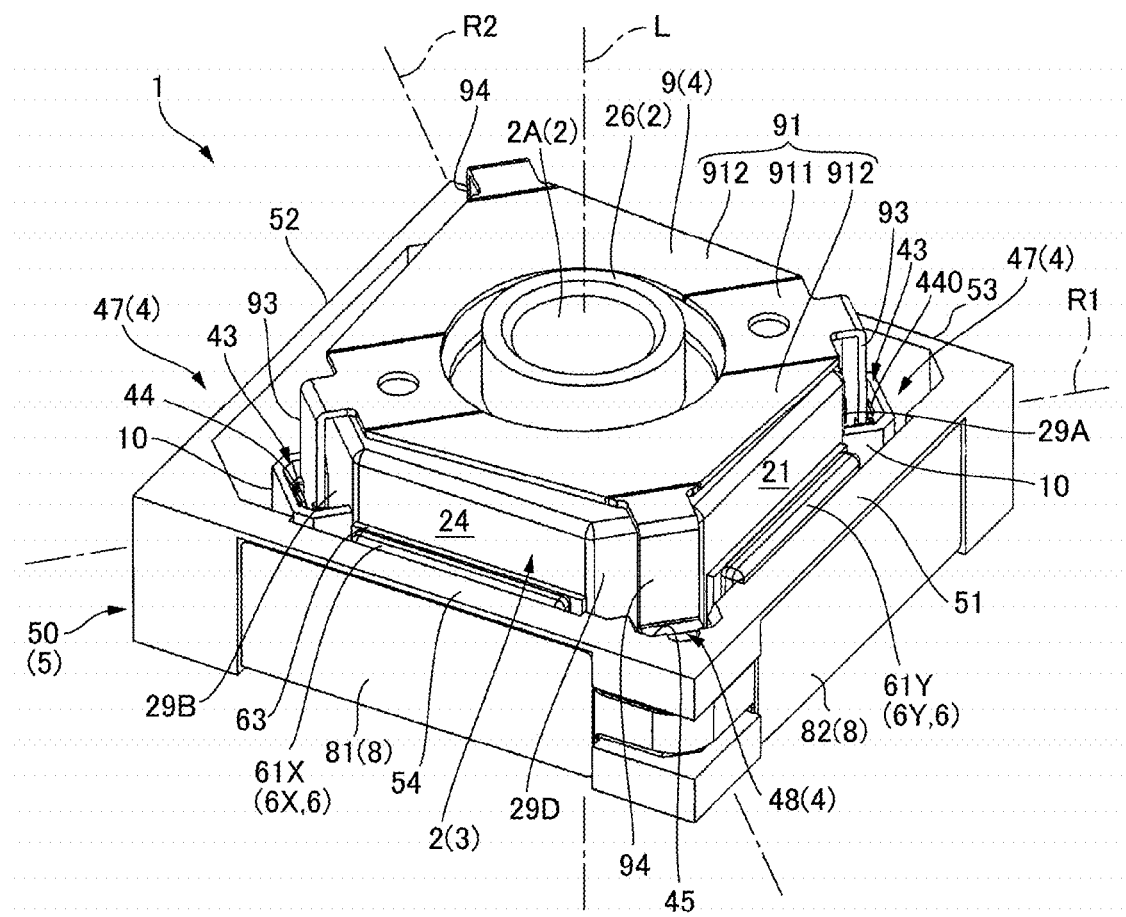
FIG. 1 is an outward perspective view showing an optical unit with a shake correction function in accordance with an embodiment of the present invention.
Figure 1:
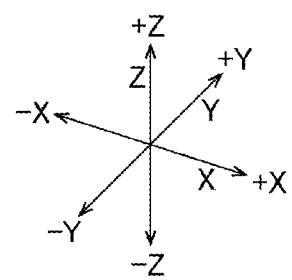
Figure 2:
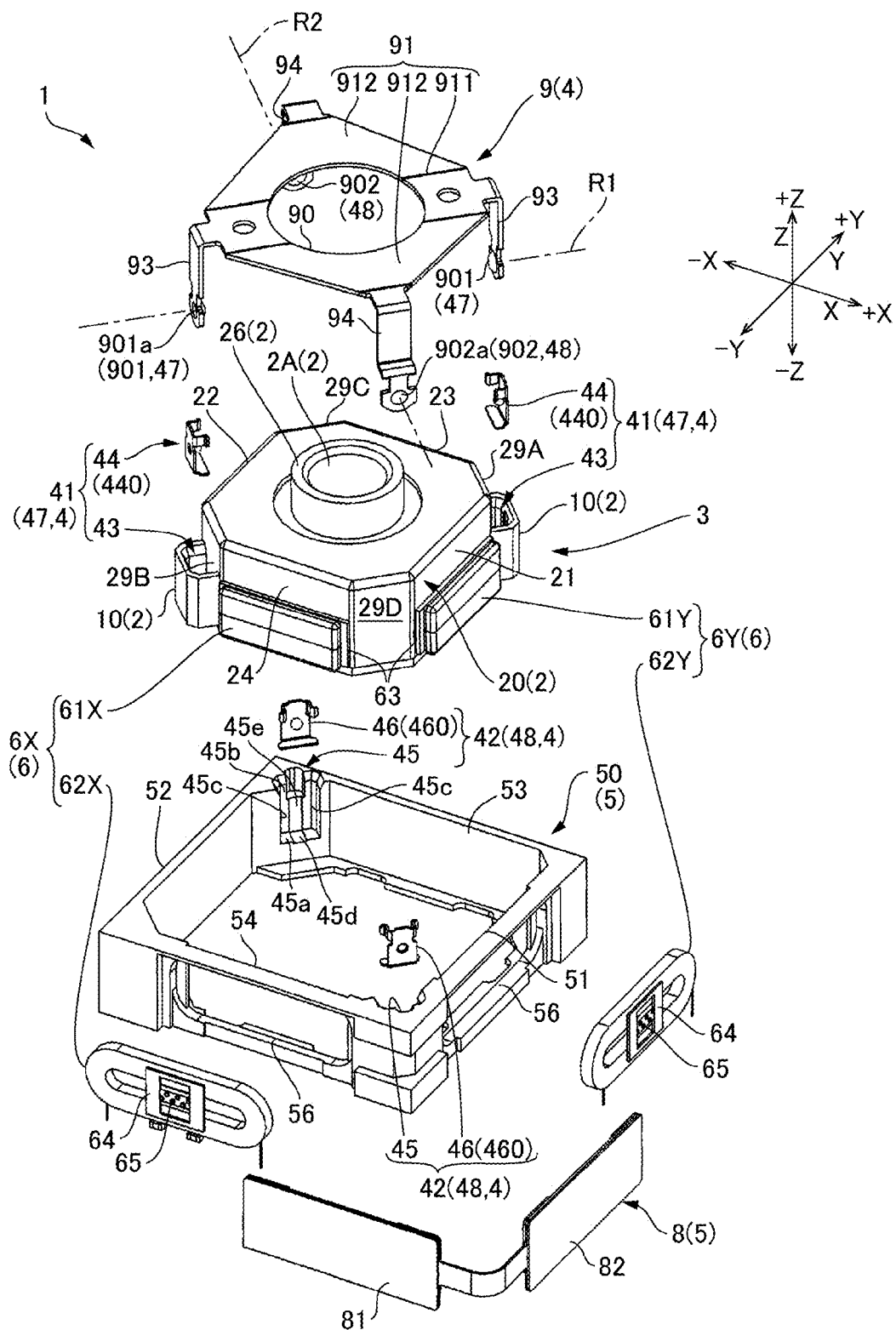
FIG. 2 is an exploded perspective view showing the optical unit with a shake correction function in FIG. 1.
Figure 3:
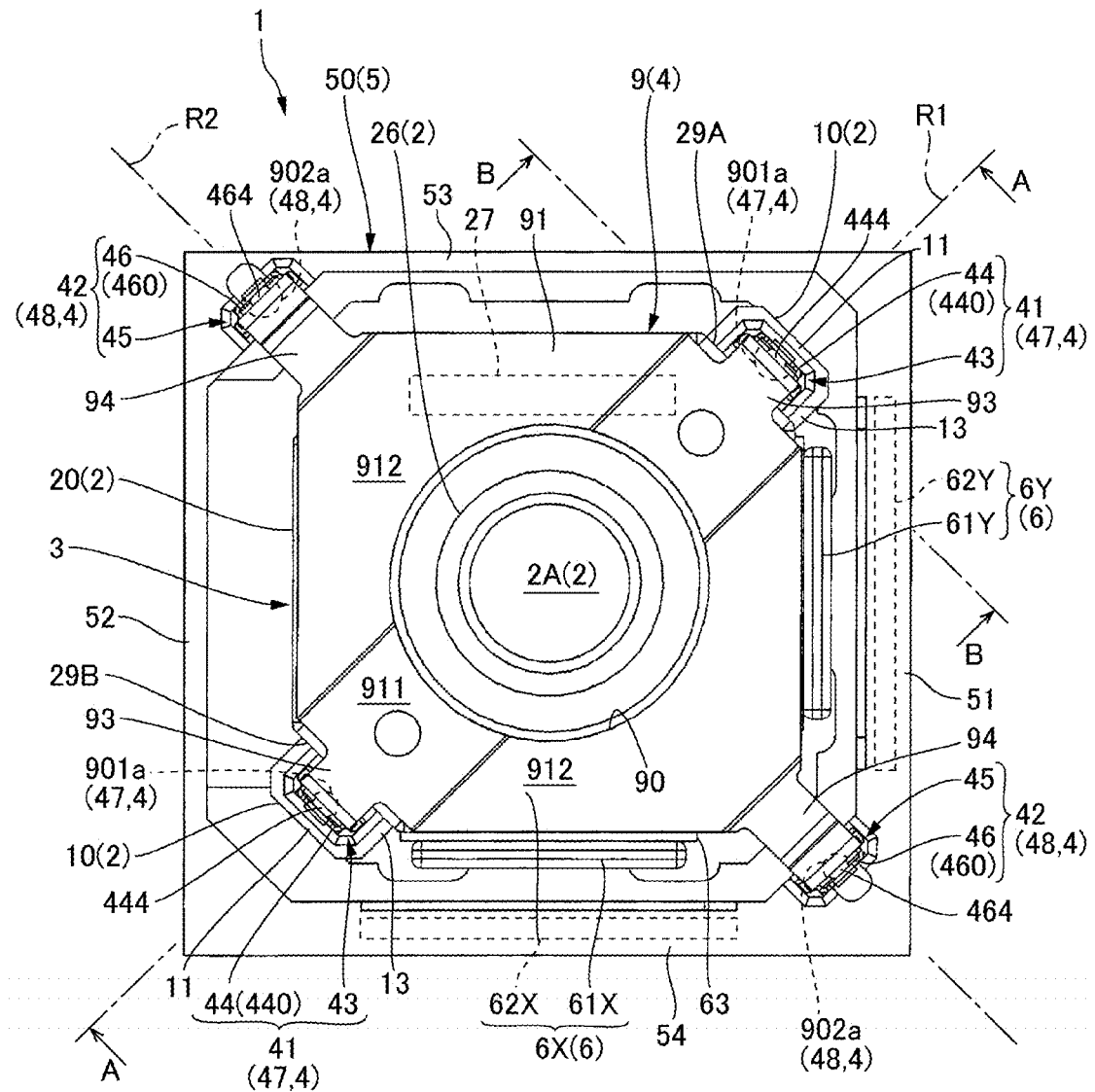
FIG. 3 is a plan view showing the optical unit with a shake correction function in FIG. 1.

FIG. 1 is a perspective view showing an optical unit 1 with a shake correction function to which an embodiment of the present invention is applied. FIG. 2 is an exploded perspective view showing the optical unit 1 with a shake correction function in FIG. 1. FIG. 3 is a plan view showing the optical unit 1 with a shake correction function in FIG. 1. An optical unit 1 with a shake correction function includes a camera module 2 having an optical element such as a lens. The optical unit 1 with a shake correction function is, for example, used in an optical device such as a cell phone with a camera and a drive recorder or in an optical device such as an action camera mounted on a movement body such as a helmet, a bicycle, a radio-controlled helicopter or a wearable camera. In the optical device, when a shake is occurred in the optical device at the time of photographing, disturbance is generated in a photographed image. In order to avoid a photographed image being inclined, the optical unit 1 with a shake correction function corrects an inclination of the camera module 2 based on acceleration, angular velocity, a shaking amount and the like detected by a detection means such as a gyroscope.

As shown in FIG. 1 through FIG. 3, the optical unit 1 with a shake correction function includes a movable body 3 provided with a camera module 2, a gimbal mechanism 4 structured to swingably support the movable body 3, a fixed body 5 which supports the movable body 3 through the gimbal mechanism 4, a shake correction drive mechanism 6 structured to swing the movable body 3 with respect to the fixed body 5, a first flexible printed circuit board (not shown) which is connected with the movable body 3, and a second flexible printed circuit board 8 which is attached to the fixed body 5.

The optical unit 1 with a shake correction function performs a shake correction by swinging the movable body 3 around two axes which intersect an optical axis "L" ("Z"-axis) and intersect each other. A shake correction around the "X"-axis and a shake correction around the "Y"-axis are performed and thereby, a shake correction in a pitching (vertical swing) direction and a shake correction in a yawing (lateral swing) direction are performed.

As shown in FIG. 1, the movable body 3 is swingably supported around a first axis "R1" perpendicular to the optical axis "L" ("Z"-axis) and is swingably supported around a second axis "R2" perpendicular to the optical axis "L" and the first axis "R1" by the gimbal mechanism 4. The first axis "R1" and the second axis "R2" are inclined by 45 degrees with respect to the "X"-axis and the "Y"-axis. When turning around the first axis "R1" and turning around the second axis "R2" are combined, the movable body 3 can be swung around the "X"-axis and the "Y"-axis. Therefore, the movable body 3 is swingably supported around the "X"-axis and around the "Y"-axis by the gimbal mechanism 4.

As shown in FIG. 2 and FIG. 3, the gimbal mechanism 4 includes first supporting point parts 41 provided at diagonal positions on the first axis "R1" of the movable body 3, second supporting point parts 42 provided at diagonal positions on the second axis line "R2" of the fixed body 5, and a gimbal frame 9. The gimbal frame 9 is a plate spring made of metal and is provided with two first support parts 901 provided at diagonal positions on the first axis "R1" and two second support parts 902 provided at diagonal positions on the second axis "R2". The gimbal mechanism 4 is assembled so that the first support part 901 is point-contacted with the first supporting point part 41 and the second support part 902 is point-contacted with the second supporting point part 42. As a result, the movable body 3 is swingably supported around the first axis "R1" and swingably supported around the second axis "R2" through the gimbal frame 9.

The first supporting point part 41 of the movable body 3 and the first support part 901 of the gimbal frame 9 structure a first connection mechanism 47 which turnably supports the movable body 3 around the first axis "R1" in the gimbal mechanism 4. Further, the second supporting point part 42 of the fixed body 5 and the second support part 902 of the gimbal frame 9 structure a second connection mechanism 48 which turnably supports the gimbal frame 9 around the second axis "R2" in the gimbal mechanism 4.

As shown in FIG. 1 through FIG. 3, the shake correction drive mechanism 6 includes a first magnetic drive mechanism 6X structured to generate a drive force for turning the movable body 3 around the "X"-axis and a second magnetic drive mechanism 6Y structured to generate a drive force for turning the movable body 3 around the "Y"-axis. In this embodiment, the first magnetic drive mechanism 6X and the second magnetic drive mechanism 6Y are respectively disposed at one position. The first magnetic drive mechanism 6X is disposed on the "−Y" direction side of the movable body 3. Further, the second magnetic drive mechanism 6Y is disposed on the "+X" direction side of the movable body 3. As described above, a position where the shake correction drive mechanism 6 is disposed is limited to two locations and thus, a shape of the optical unit 1 with a shake correction function which is viewed in the "Z"-axis direction (optical axis "L" direction) is reduced.

The first magnetic drive mechanism 6X includes one set of a magnet 61X and a coil 62X. Further, the second magnetic drive mechanism 6Y includes one set of a magnet 61Y and a coil 62Y. The magnet 61X and the coil 62X of the first magnetic drive mechanism 6X face each other in the "Y"-axis direction. The magnet 61Y and the coil 62Y of the second magnetic drive mechanism 6Y face each other in the "X"-axis direction. In this embodiment, the magnets 61X and 61Y are disposed on the movable body 3 and the coils 62X and 62Y are disposed on the fixed body 5. The arrangement of the magnets 61X and 61Y and the coils 62X and 62Y may be reversed to the arrangement in this embodiment. In other words, it may be structured that the magnets 61X and 61Y are disposed on the fixed body 5 and the coils 62X and 62Y are disposed on the movable body 3.

(Movable Body)

Figure 4:
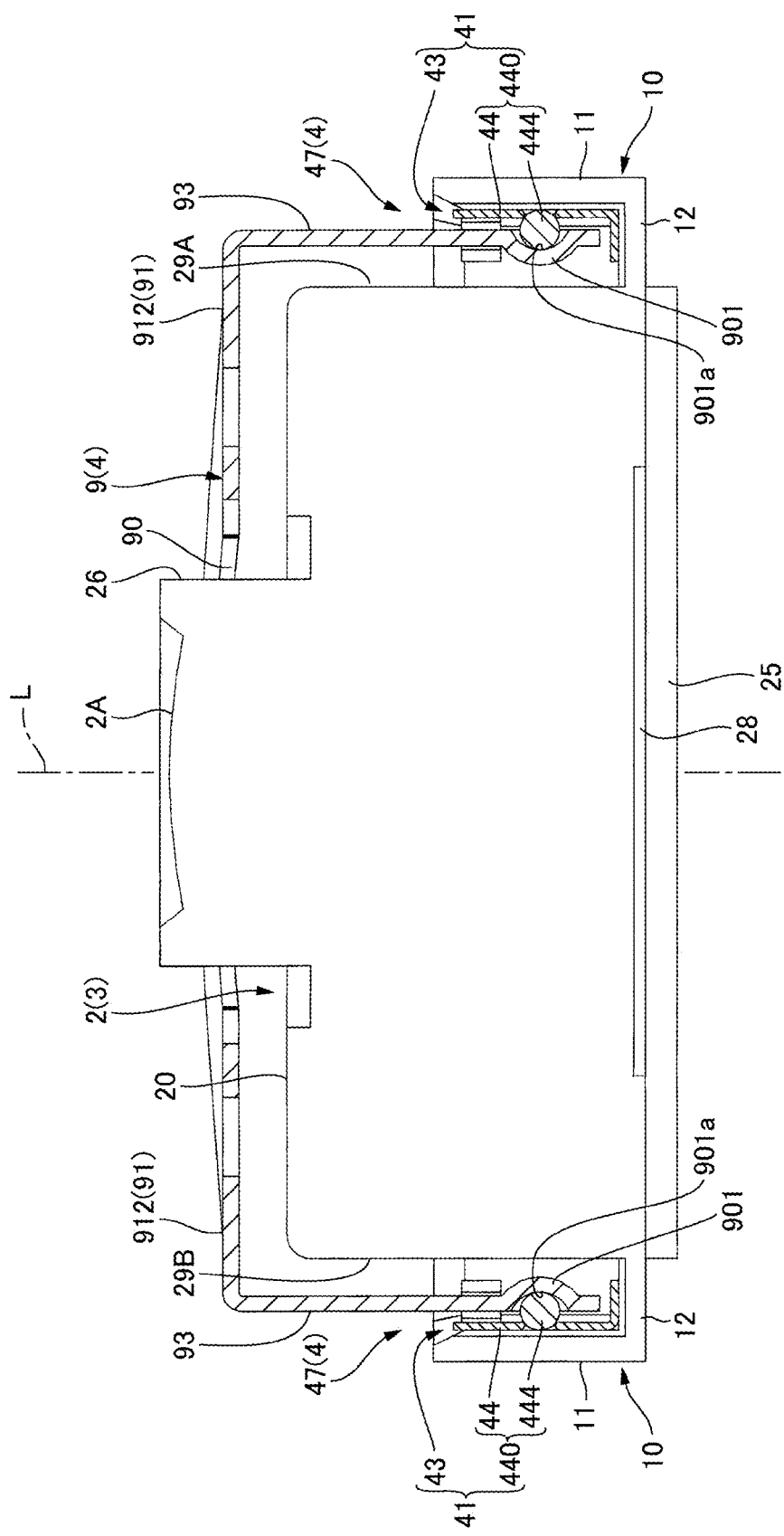
FIG. 4 is a cross-sectional view ("A-A" cross-sectional view in FIG. 3) showing a movable body and a gimbal frame which are cut along a first axis.

FIG. 4 is a cross-sectional view showing the movable body 3 and the gimbal frame 9 which are cut along the first axis "R1" and is a cross-sectional view cut at the "A-A" position in FIG. 3. As shown in FIG. 2 and FIG. 4, the movable body 3 includes the camera module 2. The camera module 2 includes a housing 20 which is an outer case, a circuit board 25 disposed at an end part in the "−Z" direction of the housing 20, a tube part 26 protruded to the "+Z" direction from the housing 20, a lens group 2A (optical element) held by the tube part 26, a lens drive mechanism 27 disposed on an inside of the housing 20, and an imaging element 28 mounted on the circuit board 25. The imaging element 28 is disposed on the optical axis "L" of the lens group 2A.

As shown in FIG. 2, the housing 20 (outer case) is formed in an octagonal planar shape when viewed in the optical axis "L" direction. The housing 20 is provided with a first side face 21 facing the "+X" direction, a second side face 22 facing the "−X" direction, a third side face 23 facing the "+Y" direction, and a fourth side face 24 facing the "−Y" direction. The magnet 61Y of the second magnetic drive mechanism 6Y is fixed to the first side face 21. Further, the magnet 61X of the first magnetic drive mechanism 6X is fixed to the fourth side face 24. In this embodiment, the housing 20 is made of resin and thus, a yoke member 63 is fixed to the first side face 21 and the fourth side face 24. The yoke member 63 is a magnetic plate, and the magnet 61Y and the magnet 61X are fixed to an outer face of the housing 20 through the yoke member 63 (magnetic plate). Each of the magnets 61X and 61Y is magnetized so that magnets of an outer side face in the radial direction are different from each other with a magnetized polarizing line located at a substantially center in the "Z"-axis (optical axis "L") direction as a boundary.

The housing 20 is provided with chamfer parts 29A and 29B formed by chamfering portions at the diagonal positions in the first axis "R1" direction and chamfer parts 29C and 29D formed by chamfering portions at the diagonal positions in the second axis "R2" direction. The chamfer part 29A is provided in a corner part where the first side face 21 of the housing 20 and the third side face 23 are connected with each other, and the chamfer part 29A is inclined by 45° with respect to the "+X" direction and the "+Y" direction. Further, the chamfer part 29B is provided in a corner part where the second side face 22 of the housing 20 and the fourth side face 24 are connected with each other, and the chamfer part 29B is inclined by 45° with respect to the "−X" direction and the "−Y" direction. The housing 20 is provided with protruded parts 10 which are protruded from the chamfer parts 29A and 29B to an outer peripheral side. In this embodiment, the protruded part 10 is integrally formed with the housing 20. The protruded part 10 is provided with a recessed part 43 which is recessed to the "−Z" direction. In accordance with an embodiment of the present invention, the protruded part 10 may be separately provided from the housing 20.

The lens drive mechanism 27 performs focusing for an object to be photographed by adjusting a lens position of the lens group 2A arranged in the optical axis "L" direction. In this embodiment, the lens drive mechanism 27 includes a magnetic drive mechanism. In accordance with an embodiment of the present invention, the lens drive mechanism 27 may include a drive source other than the magnetic drive mechanism. For example, the lens drive mechanism 27 may include a motor. The lens drive mechanism 27 is disposed on an opposite side to the first magnetic drive mechanism 6X or the second magnetic drive mechanism 6Y with the optical axis "L" interposed therebetween. In this embodiment, the lens drive mechanism 27 is disposed on an opposite side to the first magnetic drive mechanism 6X with the optical axis "L" interposed therebetween.

The movable body 3 includes the first supporting point parts 41 of the gimbal mechanism 4. In this embodiment, the first supporting point part 41 is provided in each of the two protruded parts 10 provided at the diagonal positions in the first axis "R1" direction of the camera module 2. The first supporting point part 41 is provided with a recessed part 43 provided in the protruded part 10 and a first gimbal frame receiving member 440 disposed in the recessed part 43.

(Fixed Body)

The fixed body 5 includes a case 50 made of resin, the coils 62X and 62Y disposed in coil arrangement holes 56 of the case 50, and the second flexible printed circuit board 8 which is fixed to an outer face of the case 50 so as to cover the coils 62X and 62Y from an outer side in the radial direction. The case 50 is a frame-shaped member which surrounds an outer peripheral side of the movable body 3. The case 50 is provided with a first frame part 51 and a second frame part 52 extended parallel to the "Y"-axis direction on the "+X" direction side and the "−X" direction side of the movable body 3, and a third frame part 53 and a fourth frame part 54 extended parallel to the "X"-axis direction on the "+Y" direction side and the "−Y" direction side of the movable body 3.

The case 50 is provided with the coil arrangement holes 56 to which the coil 62X of the first magnetic drive mechanism 6X and the coil 62Y of the second magnetic drive mechanism 6Y are respectively fixed with an adhesive or the like. In this embodiment, the coil arrangement hole 56 penetrates through the first frame part 51 and the fourth frame part 54. Each of the coils 62X and 62Y is an air core coil in an elliptical shape, and two long sides located on the "+Z" direction side and the "−Z" direction side are utilized as effective sides. The second flexible printed circuit board 8 is fixed to the first frame part 51 and the fourth frame part 54 of the case 50 from an outer side in the radial direction. The second flexible printed circuit board 8 is provided with a first circuit board portion 81, which is overlapped with the coil arrangement hole 56 of the fourth frame part 54 from an outer side in the radial direction, and a second circuit board portion 82 which is overlapped with the coil arrangement hole 56 of the first frame part 51 from an outer side in the radial direction. The second flexible printed circuit board 8 is fixed to the case 50 so that the coils 62X and 62Y are disposed in the coil arrangement holes 56 of the case 50 in a state that the coil 62X is fixed to the first circuit board portion 81 and the coil 62Y is fixed to the second circuit board portion 82.

Rectangular magnetic plates 64 are respectively disposed between the first circuit board portion 81 and the coil 62X and between the second circuit board portion 82 and the coil 62Y. The magnetic plate 64 disposed between the first circuit board portion 81 and the coil 62X faces the magnet 61X to structure a magnetic spring for returning the movable body 3 to a turning reference position in a turning direction around the "X"-axis. Further, the magnetic plate 64 disposed between the second circuit board portion 82 and the coil 62Y faces the magnet 61Y to structure a magnetic spring for returning the movable body 3 to a turning reference position in a turning direction around the "Y"-axis.

The magnetic plates 64 are provided with rectangular through holes at positions overlapping with center holes of the coils 62X and 62Y, and a magnetic sensor 65 is disposed in the through hole. The magnetic sensor 65 is, for example, a Hall element. The optical unit 1 with a shake correction function detects a swing angle around the "X"-axis of the movable body 3 based on an output of the magnetic sensor 65 disposed at a center of the coil 62X. Further, the optical unit 1 with a shake correction function detects a swing angle around the "Y"-axis of the movable body 3 based on an output of the magnetic sensor 65 disposed at a center of the coil 62Y.

The case 50 is provided with the second supporting point parts 42 of the gimbal mechanism 4 at two diagonal positions in the second axis "R2" direction. The second supporting point part 42 includes a recessed part 45, which is recessed to an outer side in the radial direction from an inner face of the case 50, and a second gimbal frame receiving member 460 disposed in the recessed part 45.

(Gimbal Frame 9)

Figure 5:
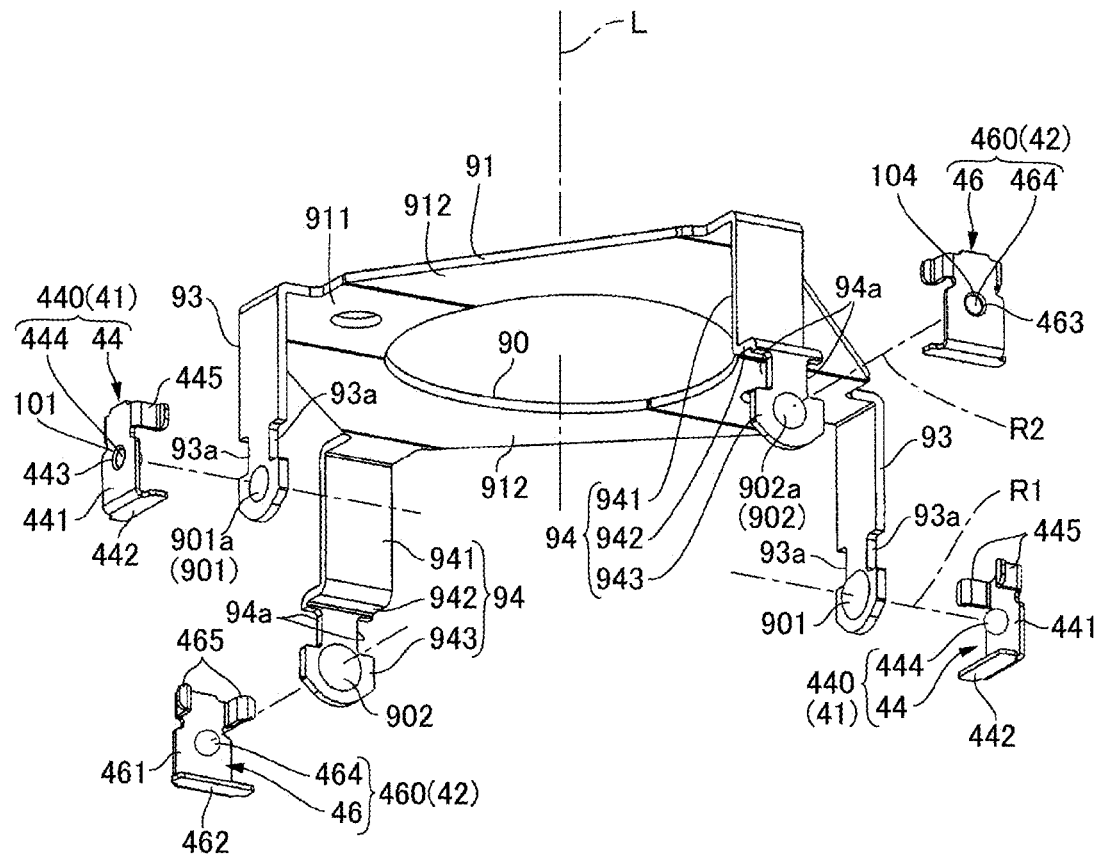
FIG. 5 is an exploded perspective view showing a gimbal frame, first gimbal frame receiving members and second gimbal frame receiving members.

FIG. 5 is an exploded perspective view showing the gimbal frame 9, the first gimbal frame receiving members 440 and the second gimbal frame receiving members 460. The gimbal frame 9 is provided with a first frame portion 91 in a substantially square shape when viewed in the "Z"-axis direction, first support part extended parts 93 which are bent at a substantially right angle from diagonal positions in the first axis "R1" direction of the first frame portion 91 and extended to the "−Z" direction, and second support part extended parts 94 which are bent at a substantially right angle from diagonal positions in the second axis "R2" direction of the first frame portion 91 and extended to the "−Z" direction. A center of the first frame portion 91 is provided with a center hole 90 which penetrates through the first frame portion 91. As shown in FIG. 3, the first frame portion 91 is overlapped with the housing 20 of the camera module 2 when viewed in the "Z"-axis (optical axis "L") direction.

As shown in FIG. 1 and FIG. 4, a center portion 911 of the first frame portion 91 located at a center in the second axis "R2" direction is recessed to the "−Z" direction, and corner portions 912 at both ends in the second axis "R2" direction are located on the "+Z" direction side with respect to the center portion 911. In other words, the corner portions 912 in the second axis "R2" direction of the first frame portion 91 are separated from the movable body 3 with respect to the center portion 911. Therefore, even when the movable body 3 is swung around the first axis "R1" on the "−Z" direction side with respect to the gimbal frame 9 and both ends in the second axis "R2" direction of the movable body 3 (in this embodiment, the corner parts in the second axis "R2" direction of the housing 20) are moved in the "Z"-axis direction, a collision of the movable body 3 with the gimbal frame 9 can be avoided.

Further, the center portion 911 is extended to corner parts in the first axis "R1" direction of the first frame portion 91. In this embodiment, the corner parts in the first axis "R1" direction of the first frame portion 91 are portions of the gimbal frame 9 which are moved largest in the "Z"-axis (optical axis "L") direction in a case that the movable body 3 is swung around the second axis "R2" and the gimbal frame 9 is swung around the second axis "R2" with the second supporting point parts 42 as a turning center. As described above, the gimbal frame 9 is formed in a shape that the center portion 911 including the corner parts in the first axis "R1" direction of the first frame portion 91 is recessed to the "−Z" direction and thus, an operation space of the gimbal frame 9 when the movable body 3 is swung can be reduced in the "Z"-axis (optical axis "L") direction. Therefore, a height in the "Z"-axis (optical axis "L") direction of a space for disposing the optical unit 1 with a shake correction function can be reduced.

As shown in FIG. 2 and FIG. 5, the first support part extended part 93 is extended in a straight line shape to the "−Z" direction from the corner part of the first frame portion 91. The first support part extended part 93 is provided with the first support part 901 having a first concave curved face 901a at its tip end portion. The first concave curved face 901a is formed by press working and is recessed to an inner side in the radial direction. A curvature radius of the first concave curved face 901a is larger than a radius of a first spherical body 444 provided in the first supporting point part 41. Further, the first support part extended part 93 is provided with a pair of first cut-out recessed parts 93a which are formed by cutting out both end edges in a circumferential direction around the optical axis "L".

As shown in FIG. 1 and FIG. 4, the first support part extended parts 93 are extended to the "−Z" direction along the chamfer parts 29A and 29B of the housing 20 on both sides in the first axis "R1" direction of the camera module 2. The protruded parts 10 protruded from the chamfer parts 29A and 29B of the housing 20 to an outer peripheral side are disposed with the first supporting point parts 41 which are supporting point parts of the gimbal mechanism 4 provided in the movable body 3. A tip end part of the first support part extended part 93 is supported by the first supporting point part 41. In this manner, the first connection mechanism 47 is structured, and the movable body 3 and the gimbal frame 9 are turnably connected with each other around the first axis "R1".

The second support part extended part 94 is provided with a first portion 941 extended to the "−Z" direction from a corner portion of the first frame portion 91, a second portion 942 which is bent at a substantially right angle from the first portion 941 and is extended to an outer side in the radial direction, and a third portion 943 which is bent at a substantially right angle from the second portion 942 and is extended to the "−Z" direction. The third portion 943 is provided with the second support part 902 having a second concave curved face 902a at its tip end portion. The second concave curved face 902a is formed by press working and is recessed to an inner side in the radial direction. A curvature radius of the second concave curved face 902a is larger than a radius of a second spherical body 464 described below which is provided in the second supporting point part 42. Further, the second support part extended part 94 is provided with a pair of second cut-out recessed parts 94a, which are formed by cutting out both end edges in a circumferential direction around the optical axis "L" in the "+Z" direction of the second support part 902. An end in the "+Z" direction of the first support part extended part 93 and an end in the "Z" direction of the second support part extended part 94 are connected with each other through the first frame portion 91.

The second support part extended parts 94 are formed so that the first portions 941 are extended to the "−Z" direction along the chamfer parts 29C and 29D of the housing 20 on both sides in the second axis "R2" direction of the camera module 2, and the third portions 943 are extended to the "−Z" direction on an outer peripheral side with respect to the first portions 941. The second supporting point parts 42 which are supporting point parts of the gimbal mechanism 4 provided in the fixed body 5 are disposed on inner faces at the diagonal positions in the second axis "R2" of the case 50. A tip end part of the second support part extended part 94 is supported by the second supporting point part 42. In this manner, the second connection mechanism 48 is structured, and the fixed body 5 and the gimbal frame 9 are turnably connected with each other around the second axis "R2".

(Details of First Connection Mechanism 47 and Second Connection Mechanism 48)

Figure 6A:
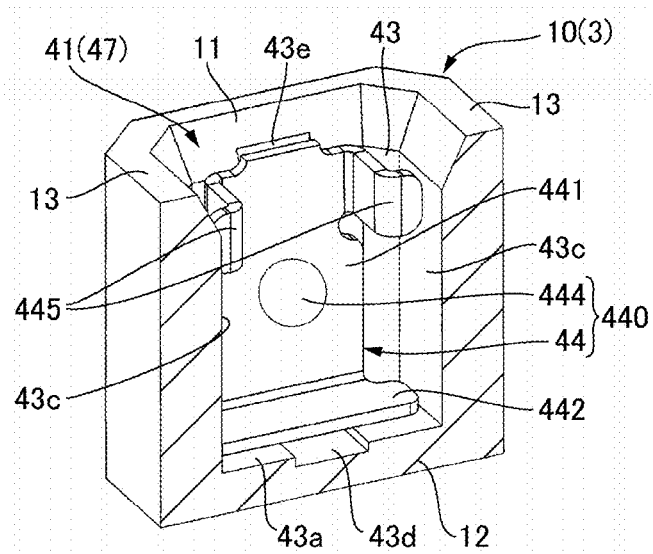
FIG. 6A is a partial cross-sectional perspective view showing a first supporting point part which is viewed from an inner peripheral side.
Figure 6B:
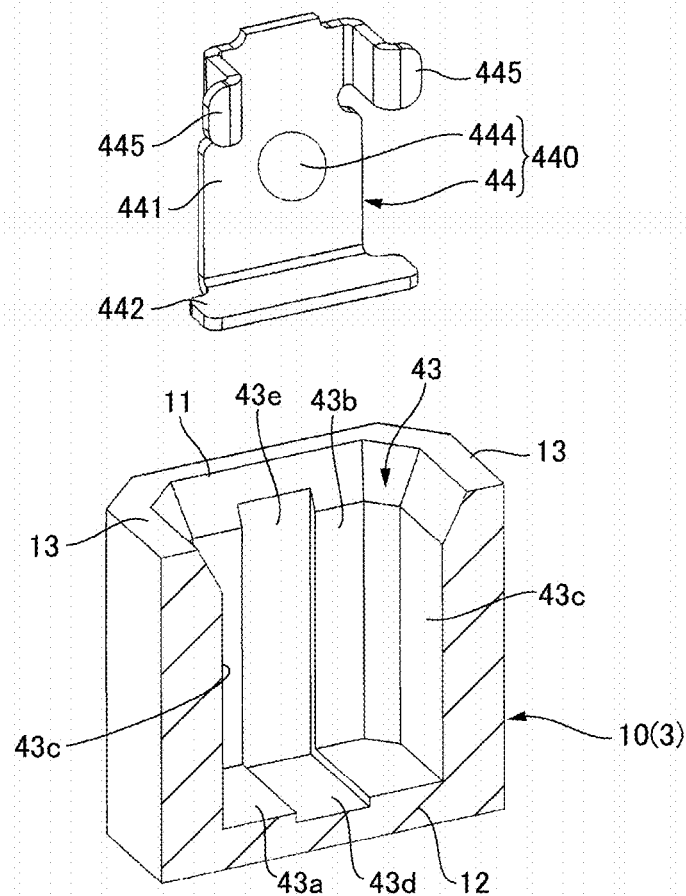
FIG. 6B is an exploded perspective view showing the first supporting point part.
Figure 7:
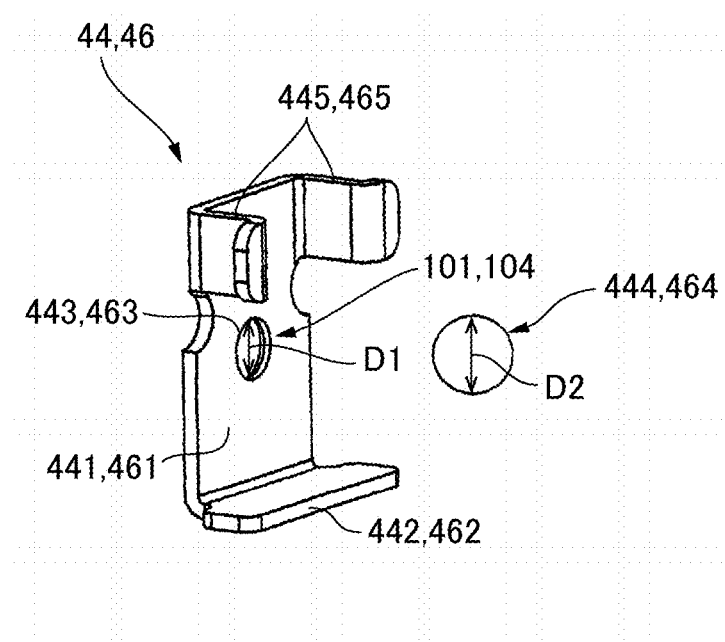
FIG. 7 is an exploded perspective view showing a first gimbal frame receiving member and a second gimbal frame receiving member.

FIG. 6A is a partial cross-sectional perspective view showing the first supporting point part 41 which is viewed from an inner peripheral side and is a cross-sectional perspective view showing the first supporting point part 41 which is cut at "B-B" position in FIG. 3. FIG. 6B is an exploded perspective view showing the first supporting point part 41. FIG. 7 is an exploded perspective view showing the first gimbal frame receiving member 440 and the second gimbal frame receiving member 460. The first gimbal frame receiving member 440 and the second gimbal frame receiving member 460 are the same shaped member as each other and thus, in FIG. 7, the first gimbal frame receiving member 440 and the second gimbal frame receiving member 460 are shown in a single drawing.

The first connection mechanism 47 includes the first support part 901 of the gimbal frame 9 and the first supporting point part 41 provided in the movable body 3. As shown in FIG. 2 and FIG. 5, the first supporting point part 41 includes the recessed parts 43 provided in the protruded part 10 which are protruded from the housing 20 to an outer peripheral side on both sides in the first axis "R1" direction of the camera module 2, first thrust receiving members 44 respectively disposed in the recessed parts 43, and the first spherical bodies 444 each of which is fixed to the first spherical body fixing part 101 (see FIG. 7) of the first thrust receiving member 44. The first thrust receiving member 44 and the first spherical body 444 structure the first gimbal frame receiving member 440 which is point-contacted with the first support part 901. Each of the recessed parts 43 is an accommodation part which accommodates the first gimbal frame receiving member 440.

As shown in FIG. 3, FIG. 4 and FIG. 6B, the protruded part 10 is provided with a wall part 11 which faces the outer peripheral face of the housing 20, and connection parts 12 and 13 which connect the wall part 11 with the housing 20. In this embodiment, the protruded part 10 which is protruded from the chamfer part 29A of the housing 20 is provided with the wall part 11 extended in the optical axis "L" direction on an outer peripheral side with respect to the chamfer part 29A, the connection part 12 which is extended from an end part in the optical axis "L" direction (in this embodiment, an end part in the "−Z" direction) of the wall part 11 to an inner peripheral side and connected with an end part in the "−Z" direction of the chamfer part 29A, and a pair of the connection parts 13 which are extended from both sides in a circumferential direction around the optical axis "L" of the wall part 11 to an inner peripheral side. Similarly, the protruded part 10 which is protruded from the chamfer part 29B of the housing 20 is provided with the wall part 11 extended in the optical axis "L" direction on an outer peripheral side with respect to the chamfer part 29B, the connection part 12 which is extended from an end part in the optical axis "L" direction (in this embodiment, an end part in the "−Z" direction) of the wall part 11 to an inner peripheral side and connected with an end part in the "−Z" direction of the chamfer part 29B, and a pair of the connection parts 13 which are extended from both sides in the circumferential direction around the optical axis "L" of the wall part 11 to an inner peripheral side.

As shown in FIG. 6B, the recessed part 43 is surrounded by the wall part 11 and the connection parts 12 and 13. The recessed part 43 is defined by a bottom face 43a extended in the first axis "R1" direction, a rear face 43b extended to the "+Z" direction from an outer peripheral end of the bottom face 43a, and a pair of side faces 43c which are extended to the "+Z" direction from both ends in the circumferential direction around the optical axis "L" of the bottom face 43a. The bottom face 43a is provided with a first groove 43d extended in the first axis "R1" direction with a constant width in its center portion in the circumferential direction. The rear face 43b is provided with a second groove 43e extended in the "Z"-axis direction with a constant width in its center portion in the circumferential direction. The first groove 43d and the second groove 43e are connected with each other.

The first thrust receiving member 44 and the first spherical body 444 are made of metal. As shown in FIG. 5 and FIG. 7, the first thrust receiving member 44 is provided with a first plate part 441 in a plate shape which is extended in the "Z"-axis direction, a second plate part 442 which is bent at a substantially right angle from an end part in the "−Z" direction of the first plate part 441 and is extended to an inner side in the radial direction, a first fixing hole 443 which penetrates through the first plate part 441 in the first axis "R1" direction, and a pair of third plate parts 445 which are bent at a substantially right angle from both sides in the circumferential direction of an end part in the "+Z" direction of the first plate part 441 and are extended to inner side in the radial direction. End parts on an inner peripheral side of a pair of the third plate parts 445 are respectively bent in directions so as to be separated from each other in the circumferential direction. The first fixing hole 443 is located between the second plate part 442 and a pair of the third plate parts 445 in the "Z"-axis direction.

As shown in FIG. 7, a diameter "D1" of the first fixing hole 443 is smaller than a diameter "D2" of the first spherical body 444. The first spherical body 444 is fixed to the first plate part 441 by welding in a state that the first spherical body 444 is partly fitted to the first fixing hole 443. An opening edge portion of the first fixing hole 443 on an inner peripheral side face of the first plate part 441 is a first spherical body fixing part 101 to which the first spherical body is fixed. As shown in FIG. 4, in a state that the first spherical body 444 has been fixed to the first spherical body fixing part 101, an end of the first spherical body 444 on an outer peripheral side in the first axis "R1" direction (end on an opposite side to the first support part 901) is located on an inner side of the first fixing hole 443. Therefore, the first spherical body 444 does not protrude from the first plate part 441 to an outer peripheral side.

The first fixing hole 443 is formed by punching work which is performed on the first thrust receiving member 44 from an opposite side (outer peripheral side) to a side where the first spherical body 444 is fixed. As a result, an opening edge portion of the first fixing hole 443 of the first plate part 441 on an opposite side to a side where the first spherical body 444 is fixed is formed in a shape enlarged in diameter to an outer side toward an opening end. Further, when punching work is performed, an end face of the first fixing hole 443 of the first plate part 441 on a side where the first spherical body 444 is fixed is formed with a burr. However, the burr is removed by crushing work or polishing work.

The first spherical body 444 is fixed to the first plate part 441 by welding. More specifically, the first spherical body 444 is placed on the first fixing hole 443 of the first thrust receiving member 44 and set in a state that the first spherical body 444 is partly fitted to the first fixing hole 443. Next, an inside of the first fixing hole 443 is irradiated with a laser beam from an opposite side to a side where the first spherical body 444 is fixed to the first plate part 441. As a result, welding is performed on a boundary portion between the first spherical body 444 and an inner wall face of the first fixing hole 443 of the first thrust receiving member 44.

As shown in FIG. 6A, when the first gimbal frame receiving member 440 is to be inserted into the recessed part 43, the third plate parts 445 of the first thrust receiving member 44 are abutted with a pair of the side faces 43c of the recessed part 43. As a result, the first supporting point part 41 is positioned in the circumferential direction around the optical axis "L". Further, the second plate part 442 of the first thrust receiving member 44 is abutted with the bottom face 43a of the recessed part 43 and thereby, the first supporting point part 41 is positioned in the "Z"-axis (optical axis "L") direction. The first thrust receiving member 44 is fixed to the recessed part 43 with an adhesive which is applied to the first groove 43d and the second groove 43e. When the first thrust receiving member 44 is fixed to the recessed part 43, as shown in FIG. 4, the first spherical bodies 444 fixed to the first plate parts 441 and the chamfer parts 29A and 29B of the housing 20 face each other in the first axis "R1" direction. In this case, the third plate parts 445 of the first thrust receiving member 44 may be provided with a narrow gap space with respect to a pair of the side faces 43c of the recessed part 43 instead of being abutted and, in this case, an inclination at a time of insertion can be prevented by the narrow gap space.

When the gimbal frame 9 and the movable body 3 are to be connected with each other, as shown in FIG. 3 and FIG. 4, each of the first support part extended parts 93 of the gimbal frame 9 is inserted into an inner peripheral side of the first gimbal frame receiving member 440 which is fixed to the recessed part 43. As a result, the first support part 901 provided in the first support part extended part 93 faces the first plate part 441 of the first thrust receiving member 44 fixed to the movable body 3, and the first spherical body 444 fixed to the first plate part 441 is inserted to the first concave curved face 901a to make the first spherical body 444 point-contact with the first support part 901. In parallel therewith, a pair of the third plate parts 445 of the first thrust receiving member 44 is inserted into a pair of the first cut-out recessed parts 93a of the first support part extended part 93. As a result, the first connection mechanism 47 is structured.

In this embodiment, the first support part extended part 93 is elastically deformable in the first axis "R1" direction and thus, when the first spherical body 444 and the first support part 901 are to be contacted with each other, the first support part extended part 93 is resiliently bent to an inner peripheral side and thereby, the first spherical body 444 is contacted with the first support part 901. As a result, the first support part extended part 93 generates an elastic force toward an outer peripheral side and thus, the first support part 901 elastically contacts with the first spherical body 444 from an inner peripheral side. Therefore, the first spherical body 444 is hard to be disengaged from the first support part 901. Further, in a state that the first connection mechanism 47 is structured, the second plate part 442 of the first thrust receiving member 44 and the first support part extended part 93 face each other with a space therebetween in the "Z"-axis direction.

Next, the second connection mechanism 48 includes the second support part 902 of the gimbal frame 9 and the second supporting point part 42 provided in the fixed body 5. As shown in FIG. 2, the second supporting point part 42 includes recessed parts 45, which are recessed to an outer side in the radial direction on an inner face of the corner part where the first frame part 51 of the case 50 and the fourth frame part 54 are connected with each other and on an inner face of the corner part where the second frame part 52 and the third frame part 53 are connected with each other, the second thrust receiving members 46 respectively disposed in the recessed parts 45, and the second spherical bodies 464 fixed to the second spherical body fixing parts 104 of the respective second thrust receiving members 46. The second thrust receiving member 46 and the second spherical body 464 structure the second gimbal frame receiving member 460 which is point-contacted with the second support part 902.

As shown in FIG. 2, each of the recessed parts 45 is defined by a bottom face 45a extended in the second axis "R2" direction, a rear face 45b extended to the "+Z" direction from an outer peripheral end of the bottom face 45a, and a pair of side faces 45c which are extended to the "+Z" direction from both ends in a circumferential direction around the optical axis "L" of the bottom face 45a. The bottom face 45a is provided with a first groove 45d extended in the second axis "R2" direction with a constant width in a center portion in the circumferential direction of the bottom face 45a. The rear face 45b is provided with a second groove 45e extended in the "Z"-axis direction with a constant width in a center portion in the circumferential direction of the rear face 45b. The first groove 45d and the second groove 45e are connected with each other.

The second thrust receiving member 46 and the second spherical body 464 are made of metal. In this embodiment, the second thrust receiving member 46 is the same member as the first thrust receiving member 44, and the second spherical body 464 is the same member as the first spherical body 444.

As shown in FIG. 5 and FIG. 7, the second thrust receiving member 46 is provided with a first plate part 461 in a plate shape which is extended in the "Z"-axis direction, a second plate part 462 which is bent at a substantially right angle from an end part in the "−Z" direction of the first plate part 461 and is extended to an inner side in the radial direction, a second fixing hole 463 which penetrates through the first plate part 461 in the second axis "R2" direction, and a pair of third plate parts 465 which are bent at a substantially right angle from both sides in a circumferential direction of an end part in the "+Z" direction of the first plate part 461 and are extended to inner side in the radial direction. End parts on an inner peripheral side of a pair of the third plate parts 465 are respectively bent in directions separated from each other in the circumferential direction. The second fixing hole 463 is located between the second plate part 462 and a pair of the third plate parts 465 in the "Z"-axis direction.

As shown in FIG. 7, a diameter "D1" of the second fixing hole 463 is smaller than a diameter "D2" of the second spherical body 464. The second spherical body 464 is fixed to the first plate part 461 by welding in a state that the second spherical body 464 is partly fitted to the second fixing hole 463. An opening edge portion of the second fixing hole 463 on an inner peripheral side face of the first plate part 461 is a second spherical body fixing part 104 to which the second spherical body 464 is fixed. In a state that the second spherical body 464 has been fixed to the second spherical body fixing part 104, an end of the second spherical body 464 on an outer peripheral side in the second axis "R2" direction (end on an opposite side to the second support part 902) is located on an inner side of the second fixing hole 463. Therefore, the second spherical body 464 does not protrude to an outer peripheral side from the first plate part 461.

The second fixing hole 463 is formed by punching work which is performed on the second thrust receiving member 46 from an opposite side (outer peripheral side) to a side where the second spherical body 464 is fixed. As a result, an opening edge portion of the second fixing hole 463 of the first plate part 461 on an opposite side to a side where the second spherical body 464 is fixed is formed in a shape enlarged in diameter to an outer side toward an opening end. Further, when punching work is performed, an end face of the second fixing hole 463 of the first plate part 461 on a side where the second spherical body 464 is fixed is formed with a burr. However, the burr is removed by crushing work or polishing work.

The second spherical body 464 is fixed to the first plate part 461 by welding. More specifically, the second spherical body 464 is placed on the second fixing hole 463 of the second thrust receiving member 46 and set in a state that the second spherical body 464 is partly fitted to the second fixing hole 463. Next, an inside of the second fixing hole 463 is irradiated with a laser beam from an opposite side to a side where the second spherical body 464 is fixed to the first plate part 461. As a result, welding is performed on a boundary portion between the second spherical body 464 and an inner wall face of the second fixing hole 463 of the second thrust receiving member 46.

When the second gimbal frame receiving member 460 is inserted into the recessed part 45 of the case 50, the third plate parts 465 of the second thrust receiving member 46 are abutted with a pair of the side faces 45c of the recessed part 45. As a result, the second supporting point part 42 is positioned in the circumferential direction around the optical axis "L". Further, the second plate part 462 of the second thrust receiving member 46 is abutted with the bottom face 45a of the recessed part 45 and thereby, the second supporting point part 42 is positioned in the "Z"-axis (optical axis "L") direction. The second thrust receiving member 46 is fixed to the recessed part 45 with an adhesive which is applied to the first groove 45d and the second groove 45e. In this case, the third plate parts 465 of the second thrust receiving member 46 may be provided with a narrow gap space with respect to a pair of the side faces 45c of the recessed part 45 instead of being abutted and, in this case, an inclination when the second thrust receiving member 46 is inserted can be prevented through the narrow gap space.

When the gimbal frame 9 and the fixed body 5 are to be connected with each other, as shown in FIG. 3, each of the second support part extended parts 94 of the gimbal frame 9 is inserted between the housing 20 and the case 50 at diagonal positions in the second axis "R2" direction of the fixed body 5. As a result, the second support part 902 provided in the second support part extended part 94 faces the first plate part 461 of the second thrust receiving member 46 fixed to the fixed body 5, and the second spherical body 464 fixed to the first plate part 461 is inserted to the second concave curved face 902a to make the second spherical body 464 point-contact with the second support part 902. In parallel therewith, a pair of the third plate parts 465 of the second thrust receiving member 46 is inserted into a pair of the second cut-out recessed parts 94a of the second support part extended part 94. As a result, the second connection mechanism 48 is structured.

In this embodiment, the second support part extended part 94 is elastically deformable in the second axis "R2" direction and thus, when the second spherical body 464 and the second support part 902 are to be contacted with each other, the second support part extended part 94 is resiliently bent to an inner peripheral side and thereby, the second spherical body 464 is contacted with the second support part 902. As a result, the second support part extended part 94 generates an elastic force toward an outer peripheral side and thus, the second support part 902 elastically contacts with the second spherical body 464 from an inner peripheral side. Therefore, the second spherical body 464 is hard to be disengaged from the second support part 902. Further, in a state that the second connection mechanism 48 is structured, the second plate part 462 of the second thrust receiving member 46 and the second support part extended part 94 face each other with a space therebetween in the "Z"-axis direction.

(Principal Operations and Effects in this Embodiment)

As described above, in the optical unit 1 with a shake correction function in this embodiment, the gimbal mechanism 4 includes the gimbal frame 9, the first connection mechanism 47 which turnably connects the movable body 3 with the gimbal frame 9 around the first axis "R1", and the second connection mechanism 48 which turnably connects the fixed body 5 and the gimbal frame 9 around the second axis "R2". The first connection mechanism 47 includes the first spherical body 444 provided in one of the movable body 3 and the gimbal frame 9, and the first concave curved face 901a which is provided in the other of the movable body 3 and the gimbal frame 9 and is point-contacted with the first spherical body 444. The second connection mechanism 48 includes the second spherical body 464 provided in one of the fixed body 5 and the gimbal frame 9, and the second concave curved face 902a which is provided in the other of the fixed body 5 and the gimbal frame 9 and is point-contacted with the second spherical body 464. The movable body 3 includes the housing 20 which is an outer case and the protruded parts 10 which are protruded from the housing 20 to an outer peripheral side at diagonal positions in the first axis "R1" direction of the housing 20, and one of the first spherical body 444 and the first concave curved face 901a is disposed in the protruded part 10.

As described above, in this embodiment, the first connection mechanism 47 of the gimbal mechanism 4 is disposed in the protruded part 10 protruded from the housing 20 which is an outer case of the movable body 3. Therefore, the housing 20 is not required to provide a new structure on an outer peripheral side other than the protruded parts 10 disposed at the diagonal positions and thus, an outer shape of the movable body 3 can be made small. Therefore, the size of the movable body 3 can be reduced and the size of the optical unit 1 with a shake correction function can be reduced. Further, an outer shape of the movable body 3 can be made small and thus, a weight of the movable body 3 can be reduced.

In this embodiment, the movable body 3 is the camera module 2 including the lens group 2A which is an optical element, the imaging element 28 disposed on the optical axis "L" of the lens group 2A, and the housing 20 which is an outer case, and the protruded parts 10 are provided in the camera module 2. As described above, since the protruded parts 10 are provided at the diagonal positions in the first axis "R1" direction of the camera module 2, a new structure is not required to provide on an outer peripheral side of the camera module 2 for disposing the first connection mechanism 47. Therefore, a size of the movable body 3 can be reduced in a direction perpendicular to the optical axis "L".

In this embodiment, the protruded part 10 is integrally formed with the housing 20 (outer case). According to this structure, in comparison with a case that the protruded part 10 is separately provided from the housing 20, the number of components can be reduced. Further, fixing work of the protruded part 10 is not required and thus, assembling work can be simplified. Further, the protruded part 10 is not dropped.

The housing 20 (outer case) in this embodiment are provided with the chamfer parts 29A and 29B which are formed by chamfering the corner parts in the first axis "R1" direction when viewed in the optical axis "L" direction, and the protruded parts 10 are protruded from the chamfer parts 29A and 29B. For example, the housing 20 is formed in an octagonal planar shape which is structured by chamfering corner parts in a rectangular shape whose diagonal directions are the first axis "R1" and the second axis "R2" when viewed in the optical axis "L" direction. According to this structure, a space for disposing the protruded part 10 can be secured at a diagonal position in the first axis "R1" direction. Therefore, an outer shape of the movable body 3 can be made small in a direction perpendicular to the optical axis "L".

The shake correction drive mechanism 6 in this embodiment includes the magnets 61X and 61Y provided in the movable body 3 and the coils 62X and 62Y provided in the fixed body 5, and the magnets 61X and 61Y are fixed to the housing 20 (outer case). According to this structure, a new structure is not required to provide on an outer peripheral side of the camera module 2 for fixing the magnets 61X and 61Y. Therefore, the movable body 3 can be made small in a direction perpendicular to the optical axis "L".

In this embodiment, the camera module 2 includes the lens drive mechanism 27 structured to drive the lens group 2A, and the housing 20 is made of resin which is a nonmagnetic member. The magnets 61X and 61Y of the shake correction drive mechanism 6 are fixed to the outer peripheral face of the housing 20, which is an outer case, through the yoke member 63 which is a magnetic plate. Therefore, the magnetic fields generated from the magnets 61X and 61Y can be shielded by the yoke members 63 and thus, the magnets 61X and 61Y fixed on the outer side of the housing 20 can be prevented from magnetically affecting the lens drive mechanism 27 disposed on an inner side of the housing 20.

In this embodiment, the first connection mechanism 47 includes the first gimbal frame receiving member 440 provided with the first spherical body 444. Further, the protruded part 10 is provided with the recessed part 43 which is an accommodation part in which the first gimbal frame receiving member 440 is accommodated. Therefore, the first connection mechanism 47 is disposed at a position where the first connection mechanism 47 is hard to be affected from the outside.

The gimbal frame 9 in this embodiment is provided with the first support part extended parts 93 which are extended in the optical axis "L" direction from the diagonal positions in the first axis "R1" direction of the first frame portion 91 which is overlapped with the housing 20 when viewed in the optical axis "L" direction. The first support part extended part 93 is elastically deformable in the first axis "R1" direction, and the first concave curved face 901a provided in the first support part extended part 93 is elastically contacted with the first spherical body 444 provided in the protruded part 10 in the first axis "R1" direction. Further, the gimbal frame 9 is provided with the second support part extended parts 94 which are extended in the optical axis "L" direction from the diagonal positions in the second axis "R2" direction of the first frame portion 91. The second support part extended part 94 is elastically deformable in the second axis "R2" direction, and the second concave curved face 902a provided in the second support part extended part 94 is elastically contacted with the second spherical body 464 provided in the fixed body 5 in the second axis "R2" direction. According to this structure, the first spherical body 444 and the first concave curved face 901a can be elastically contacted with each other by an elastic force of the first support part extended part 93, and the second spherical body 464 and the second concave curved face 902a can be elastically contacted with each other by an elastic force of the second support part extended part 94. Therefore, the first spherical body 444 and the first concave curved face 901a are surely abutted with each other, and the second spherical body 464 and the second concave curved face 902a are surely abutted with each other and thus, deviation of the support position in the gimbal mechanism 4 is suppressed.

In this embodiment, the first support part extended part 93 generates an elastic force toward an outer peripheral side, and the first concave curved face 901a provided in the first support part extended part 93 elastically contacts with the first spherical body 444 provided in the protruded part 10 from an inner peripheral side. As described above, in a case that a member to which an elastic force of the first support part extended part 93 is applied is disposed on an outer peripheral side of the first support part extended part 93, the gimbal mechanism 4 can be assembled while visually recognizing a position of a member to which an elastic force of the first support part extended part 93 is applied. Therefore, the gimbal mechanism 4 is easily assembled.

The protruded part 10 in this embodiment is provided with the wall part 11 disposed on an outer peripheral side with respect to the first support part extended part 93, the connection part 12 which connects an end part in the optical axis "L" direction of the wall part 11 with the outer peripheral face of the housing 20, and a pair of the connection parts 13 which connect both end parts of the wall part 11 in a circumferential direction around the optical axis "L" with the outer peripheral face of the housing 20. According to this structure, an elastic force of the first support part extended part 93 toward an outer side direction is received by the wall part 11 and thus, deviation of the support position in the gimbal mechanism 4 can be reduced. Further, the second plate part 442 of the first thrust receiving member 44 is abutted with the connection part 12 and thus, the first supporting point part 41 is positioned in the "Z"-axis (optical axis "L") direction.

Modified Embodiments (1)

Figures 8A, 8B:
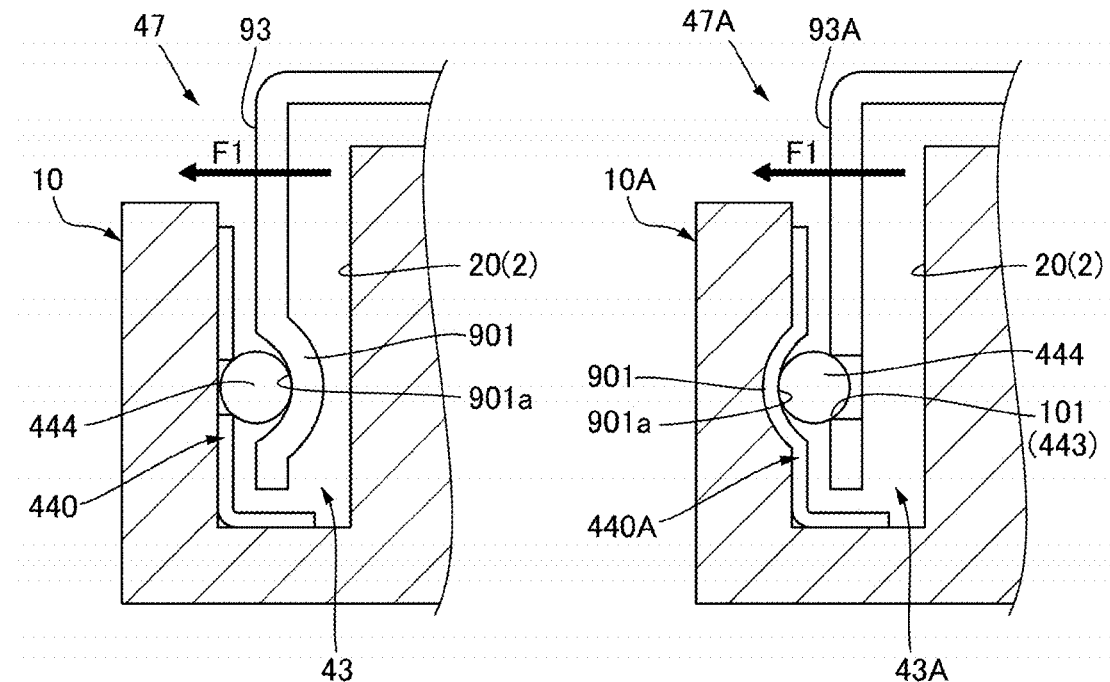
FIG. 8A and FIG. 8B are cross-sectional views schematically showing a first connection mechanism in an optical unit with a shake correction function shown in FIG. 1 and a first connection mechanism in a first modified embodiment.

FIG. 8A is a cross-sectional view schematically showing the first connection mechanism 47 in the optical unit 1 with a shake correction function shown in FIG. 1, and FIG. 8B is a cross-sectional view schematically showing the first connection mechanism 47A in a first modified embodiment of the present invention. In the embodiment described above, as shown in FIG. 8A, as an arrangement of the first spherical body 444 and the first concave curved face 901a in the first connection mechanism 47, a structure is used that the first spherical body 444 is disposed in the protruded part 10 provided in the movable body 3, and the first concave curved face 901a is provided in the first support part extended part 93 of the gimbal frame 9. However, a structure may be used that an arrangement of the first spherical body 444 and the first concave curved face 901a is reversed.

As shown in FIG. 8B, in the first modified embodiment, a tip end part of a first support part extended part 93A of the gimbal frame 9 is formed with a first fixing hole 443 provided with a first spherical body fixing part 101. The first spherical body 444 is provided in a state that the first spherical body 444 is partly fitted to the first spherical body fixing part 101 from an outer peripheral side and is fixed to the first support part extended part 93A by welding. On the other hand, in the movable body 3, a first gimbal frame receiving member 440A is fixed to a recessed part 43A of a protruded part 10A provided in the housing 20. The first gimbal frame receiving member 440A in the first modified embodiment is provided with a first support part 901 having a first concave curved face 901a which is recessed to an outer side in the radial direction.

In the embodiment described above, when the first connection mechanism 47 is to be structured, assembling is performed by resiliently bending the first support part extended part 93 to an inner peripheral side and thus, as shown in FIG. 8A, the first support part extended part 93 generates an elastic force "F1" toward an outer peripheral side. Also, in the first modified embodiment, similarly, assembling is performed by resiliently bending the first support part extended part 93A to an inner peripheral side and thus, the first support part extended part 93A generates an elastic force "F1" toward an outer peripheral side. Therefore, in the first connection mechanism 47A in the first modified embodiment, the first spherical body 444 is elastically contacted with the first concave curved face 901a from an inner peripheral side and thus, similarly to the embodiment described above, deviation of the support position in the gimbal mechanism 4 is suppressed. Further, in the first connection mechanism 47A in the first modified embodiment, similarly to the embodiment described above, a member which receives an elastic force of the first support part extended part 93A is disposed on an outer peripheral side with respect to the first support part extended part 93A and thus, the gimbal mechanism 4 is easily assembled.

(2)

Figure 9A:
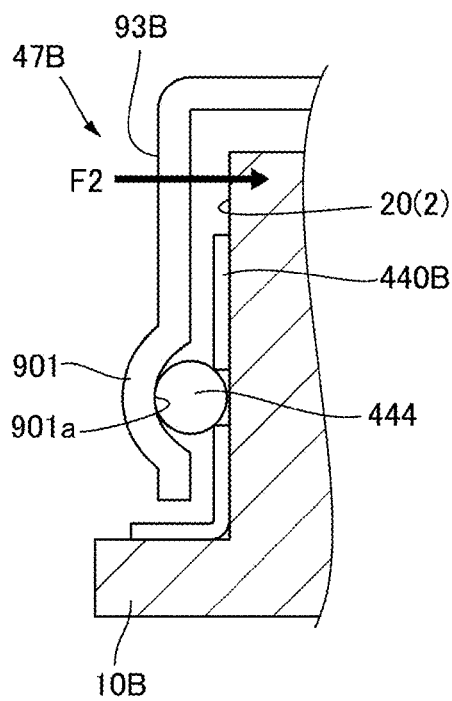
FIG. 9A and FIG. 9B are cross-sectional views schematically showing a first connection mechanism in a second modified embodiment and a first connection mechanism in a third modified embodiment.
Figure 9B:
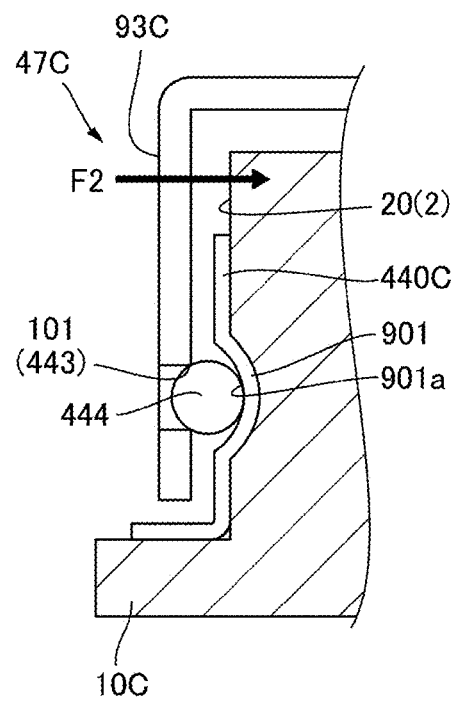

FIG. 9A is a cross-sectional view schematically showing a first connection mechanism 47B in a second modified embodiment, and FIG. 9B is a cross-sectional view schematically showing a first connection mechanism 47C in a third modified embodiment. In the embodiments described above, the first support part extended part 93 generates an elastic force "F1" toward an outer peripheral side. However, in the second and third modified embodiments, a structure is used that an elastic force "F2" is generated toward an inner peripheral side.

As shown in FIG. 9A, in the second modified embodiment, a first support part extended part 93B of the gimbal frame 9 is provided with a first support part 901 having a first concave curved face 901a which is recessed to an outer side in the radial direction. On the other hand, a protruded part 10B provided in the housing 20 of the movable body 3 is fixed with a first gimbal frame receiving member 440B provided with a first spherical body 444. The protruded part 10B in the second modified embodiment is provided with no wall part disposed on an outer peripheral side with respect to the first gimbal frame receiving member 440B, and the first gimbal frame receiving member 440B is fixed in a posture that the first spherical body 444 faces an outer peripheral side in the first axis "R1" direction.

In the second modified embodiment, when the first connection mechanism 47B is to be structured, assembling is performed by resiliently bending the first support part extended part 93B to an outer peripheral side. Therefore, as shown in FIG. 9A, the first support part extended part 93B generates an elastic force "F2" toward an inner peripheral side. As a result, in the first connection mechanism 47B in the second modified embodiment, the first concave curved face 901a is elastically contacted with the first spherical body 444 from an outer peripheral side and thus, similarly to the embodiments described above, deviation of the support position in the gimbal mechanism 4 can be suppressed.

As shown in FIG. 9B, in the third modified embodiment, a first fixing hole 443 provided with a first spherical body fixing part 101 is formed in a tip end part of a first support part extended part 93C of the gimbal frame 9. The first spherical body 444 is fixed in a state that the first spherical body 444 is partly fitted to the first spherical body fixing part 101 from an inner peripheral side and is fixed to the first support part extended part 93C by welding. On the other hand, in the movable body 3, a first gimbal frame receiving member 440C is fixed to a protruded part 10C provided in the housing 20. The first gimbal frame receiving member 440C in the third modified embodiment is provided with a first support part 901 having a first concave curved face 901a which is recessed toward an inner side in the radial direction, and the first gimbal frame receiving member 440C is fixed in a posture that the first concave curved face 901a faces an outer peripheral side in the first axis "R1" direction.

In the third modified embodiment, when the first connection mechanism 47B is to be structured, similarly to the second modified embodiment, assembling is performed by resiliently bending the first support part extended part 93C to an outer peripheral side. Therefore, as shown in FIG. 9B, the first support part extended part 93C generates an elastic force "F2" to an inner peripheral side. As a result, in the first connection mechanism 47C in the third modified embodiment, the first spherical body 444 is elastically contacted with the first concave curved face 901a from an outer peripheral side and thus, similarly to the embodiments described above, deviation of the support position in the gimbal mechanism 4 can be suppressed.

(3)

The protruded part 10 in the embodiment described above is provided with the connection part 12, which connects an end part in the optical axis "L" direction of the wall part 11 with the outer peripheral face of the housing 20, and a pair of the connection parts 13 which connect both end parts in a circumferential direction around the optical axis "L" of the wall part 11 with the outer peripheral face of the housing 20. However, the protruded part 10 may be formed in a shape only with the wall part 11 and the connection part 12 and without providing with the connection parts 13. According to this structure, since no connection parts 13 are provided, a structure of the protruded part 10 can be simplified and a width in a circumferential direction of the protruded part 10 can be reduced.

(4)

In the embodiments described above, the housing 20 of the camera module 2 is structured of a nonmagnetic member, but the housing 20 may be structured of a magnetic member. According to this structure, magnetic fields generated from the magnets 61X and 61Y of the shake correction drive mechanism 6 can be shielded by the housing 20. Therefore, the magnets 61X and 61Y of the shake correction drive mechanism 6 can be prevented from magnetically affecting the lens drive mechanism 27 (magnetic drive mechanism) mounted on the camera module 2. Since the housing 20 functions as a yoke member, the yoke member 63 in the embodiment described above can be omitted and the magnets 61X and 61Y can be directly fixed to the housing 20.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. An optical unit with a shake correction function comprising:
    a movable body comprising an optical element;
    a gimbal mechanism which swingably supports the movable body around a first axis intersecting an optical axis and swingably supports the movable body around a second axis intersecting the optical axis and the first axis;
    a fixed body which supports the movable body through the gimbal mechanism; and
    a shake correction drive mechanism structured to swing the movable body around the first axis and around the second axis;
    wherein the gimbal mechanism comprises:
        a gimbal frame;
        a first connection mechanism which turnably connects the movable body with the gimbal frame around the first axis; and
        a second connection mechanism which turnably connects the fixed body with the gimbal frame around the second axis;
    wherein the first connection mechanism comprises:
        a first spherical body provided in one of the movable body and the gimbal frame; and
        a first concave curved face which is provided in an other of the movable body and the gimbal frame and is point-contacted with the first spherical body;
    wherein the second connection mechanism comprises:
        a second spherical body provided in one of the fixed body and the gimbal frame; and
        a second concave curved face which is provided in an other of the fixed body and the gimbal frame and is point-contacted with the second spherical body;
    wherein the optical element is a lens,
    wherein the movable body is a camera module comprising:
        the lens;
        an imaging element which is disposed on the optical axis of the lens;
        an outer case; and
        a protruded part which is protruded from the outer case to an outer peripheral side at a diagonal position of the outer case in a direction of the first axis;
    wherein the outer case comprises a chamfer part which is formed by chamfering a corner part in the direction of the first axis when viewed in a direction of the optical axis, and the protruded part is protruded from the chamfer part; and
    wherein one of the first spherical body and the first concave curved face is disposed in the protruded part.

2. The optical unit with the shake correction function according to claim 1, wherein the protruded part is integrally formed with the outer case.

3. The optical unit with the shake correction function according to claim 1, wherein the outer case is formed in an octagonal planar shape which is formed by chamfering corner parts of a rectangular shape whose diagonal directions are the first axis and the second axis when viewed in the direction of the optical axis.

4. The optical unit with the shake correction function according to claim 1, wherein
the shake correction drive mechanism comprises a magnet provided in the movable body and a coil provided in the fixed body, and
the magnet is fixed to the outer case.

5. The optical unit with the shake correction function according to claim 4, wherein
the camera module comprises a magnetic drive mechanism structured to drive the lens, and
the outer case is made of a magnetic member.

6. The optical unit with the shake correction function according to claim 4, wherein
the camera module comprises a magnetic drive mechanism structured to drive the lens,
the outer case is made of a nonmagnetic member, and
the magnet is fixed to the outer case through a magnetic plate.

7. The optical unit with the shake correction function according to claim 1, wherein
the first connection mechanism comprises a gimbal frame receiving member comprising
one of the first spherical body and the first concave curved face, and
the protruded part comprises an accommodation part in which the gimbal frame receiving member is disposed.

8. An optical unit with a shake correction function comprising:
a movable body comprising an optical element;
a gimbal mechanism which swingably supports the movable body around a first axis intersecting an optical axis and swingably supports the movable body around a second axis intersecting the optical axis and the first axis;
a fixed body which supports the movable body through the gimbal mechanism; and
a shake correction drive mechanism structured to swing the movable body around the first axis and around the second axis;
wherein the gimbal mechanism comprises:
a gimbal frame;
a first connection mechanism which turnably connects the movable body with the gimbal frame around the first axis; and
a second connection mechanism which turnably connects the fixed body with the gimbal frame around the second axis;
wherein the first connection mechanism comprises:
a first spherical body provided in one of the movable body and the gimbal frame; and
a first concave curved face which is provided in an other of the movable body and the gimbal frame and is point-contacted with the first spherical body;
wherein the second connection mechanism comprises:
a second spherical body provided in one of the fixed body and the gimbal frame; and
a second concave curved face which is provided in an other of the fixed body and the gimbal frame and is point-contacted with the second spherical body;
wherein the optical element is a lens;
wherein the movable body is a camera module comprising:
the lens;
an imaging element which is disposed on the optical axis of the lens;
an outer case; and
a protruded part which is protruded from the outer case to an outer peripheral side at a diagonal position of the outer case in a direction of the first axis;
wherein one of the first spherical body and the first concave curved face is disposed in the protruded part;
wherein
the shake correction drive mechanism comprises a magnet provided in the movable body and a coil provided in the fixed body, and
wherein the magnet is fixed to the outer case.

9. The optical unit with the shake correction function according to claim 8, wherein
the camera module comprises a magnetic drive mechanism structured to drive the lens, and
the outer case is made of a magnetic member.

10. The optical unit with the shake correction function according to claim 8, wherein
the camera module comprises a magnetic drive mechanism structured to drive the lens,
the outer case is made of a nonmagnetic member, and
the magnet is fixed to the outer case through a magnetic plate.

11. The optical unit with the shake correction function according to claim 8, wherein
the first connection mechanism comprises a gimbal frame receiving member comprising one of the first spherical body and the first concave curved face, and
the protruded part comprises an accommodation part in which the gimbal frame receiving member is disposed.

12. An optical unit with a shake correction function comprising:
a movable body comprising an optical element;
a gimbal mechanism which swingably supports the movable body around a first axis intersecting an optical axis and swingably supports the movable body around a second axis intersecting the optical axis and the first axis;
a fixed body which supports the movable body through the gimbal mechanism; and
a shake correction drive mechanism structured to swing the movable body around the first axis and around the second axis;
wherein the gimbal mechanism comprises:
a gimbal frame;
a first connection mechanism which turnably connects the movable body with the gimbal frame around the first axis; and
a second connection mechanism which turnably connects the fixed body with the gimbal frame around the second axis;
wherein the first connection mechanism comprises:
a first spherical body provided in one of the movable body and the gimbal frame; and
a first concave curved face which is provided in an other of the movable body and the gimbal frame and is point-contacted with the first spherical body;
wherein the second connection mechanism comprises:
a second spherical body provided in one of the fixed body and the gimbal frame; and
a second concave curved face which is provided in an other of the fixed body and the gimbal frame and is point-contacted with the second spherical body;
wherein the movable body comprises:
an outer case; and a protruded part which is protruded from the outer case to an outer peripheral side at a diagonal position of the outer case in a direction of the first axis;

wherein one of the first spherical body and the first concave curved face is disposed in the protruded part;

wherein the gimbal frame comprises:

a first frame portion which is overlapped with the outer case when viewed in the direction of the optical axis;

a first support part extended part which is extended to the direction of the optical axis from a diagonal position in the direction of the first axis of the first frame portion; and a second support part extended part which is extended to the direction of the optical axis from a diagonal position in the direction of the second axis of the first frame portion, wherein the first support part extended part is elastically deformable in the direction of the first axis, wherein one of the first spherical body and the first concave curved face is provided in the first support part extended part and is elastically contacted in the direction of the first axis with an other of the first spherical body and the first concave curved face which is disposed in the protruded part, wherein the second support part extended part is elastically deformable in the direction of the second axis, and wherein one of the second spherical body and the second concave curved face is provided in the second support part extended part and is elastically contacted in the direction of the second axis with an other of the second spherical body and the second concave curved face which is disposed in the fixed body.

13. The optical unit with the shake correction function according to claim 12, wherein the first support part extended part generates an elastic force toward an outer peripheral side, and one of the first spherical body and the first concave curved face is provided in the first support part extended part and is elastically contacted from an inner peripheral side with the other of the first spherical body and the first concave curved face disposed in the protruded part.

14. The optical unit with the shake correction function according to claim 13, wherein the protruded part comprises:

a wall part which is disposed on an outer peripheral side with respect to the first support part extended part; and a connection part which connects an end part in the direction of the optical axis of the wall part with an outer peripheral face of the outer case.

15. The optical unit with the shake correction function according to claim 12, wherein the first support part extended part generates an elastic force toward an inner peripheral side, and one of the first spherical body and the first concave curved face is provided in the first support part extended part and is elastically contacted from an outer peripheral side with the other of the first spherical body and the first concave curved face which is disposed in the protruded part.

16. The optical unit with the shake correction function according to claim 12, wherein the optical element is a lens, the movable body is a camera module comprising the lens, an imaging element which is disposed on the optical axis of the lens, the outer case, and the protruded part, the outer case comprises a chamfer part which is formed by chamfering a corner part in the direction of the first axis when viewed in a direction of the optical axis, and the protruded part is protruded from the chamfer part.

* * * * *